(No Model.) 5 Sheets—Sheet 1.

E. B. CUTTEN.
ELECTRIC ARC LAMP.

No. 324,305. Patented Aug. 11, 1885.

WITNESSES:
Geo. H. Fraser
E. R. Bolton

INVENTOR:
Edwin B. Cutten
By his Attorneys,
Burke, Fraser & Connett (No Model.) 5 Sheets—Sheet 2.
E. B. CUTTEN.
ELECTRIC ARC LAMP.

No. 324,305. Patented Aug. 11, 1885.

WITNESSES: Geo. H. Fraser. J. B. Bolton.

INVENTOR: Elisha B. Cutten By his Attorneys, Burke, Fraser & Connett (No Model.)  5 Sheets—Sheet 3.

E. B. CUTTEN.
ELECTRIC ARC LAMP.

No. 324,305. Patented Aug. 11, 1885.

WITNESSES:  
Geo. H. Fraser.  
E. B. Bolton.

INVENTOR:  
Elisha B. Cutten  
By his Attorneys,  
Burke, Fraser & Connell (No Model.)  E. B. CUTTEN.  5 Sheets—Sheet 4.
ELECTRIC ARC LAMP.
No. 324,305.  Patented Aug. 11, 1885.
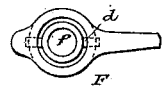
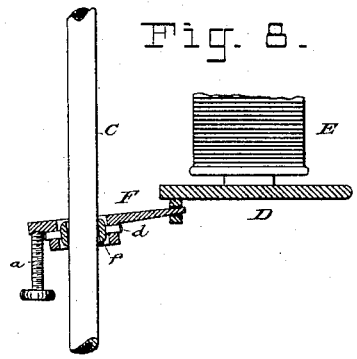
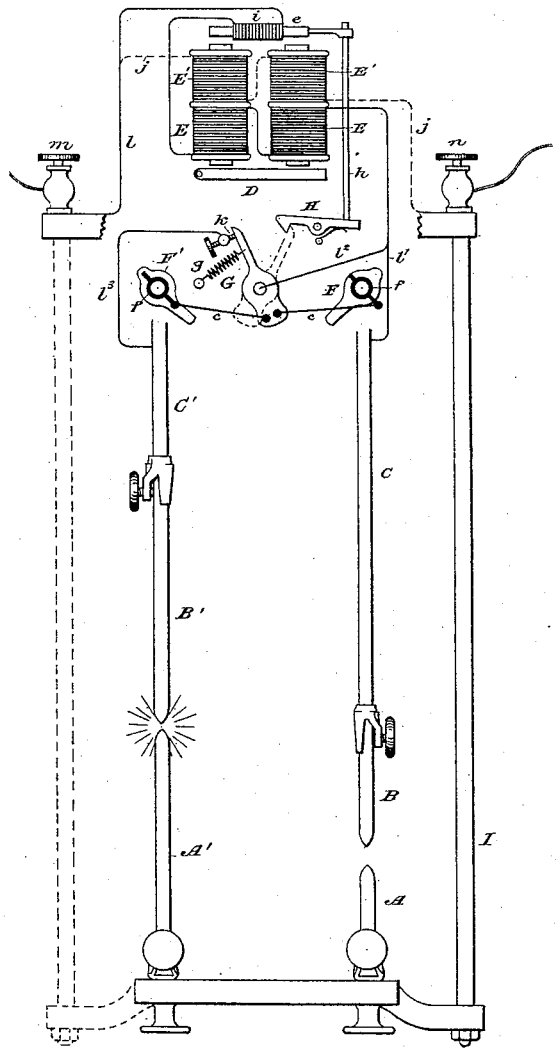
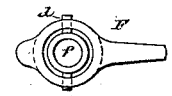
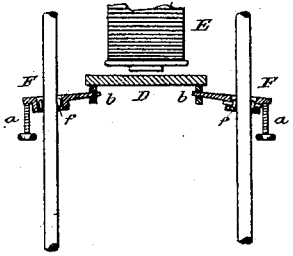
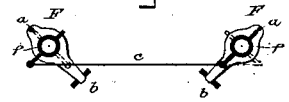
WITNESSES:  INVENTOR:

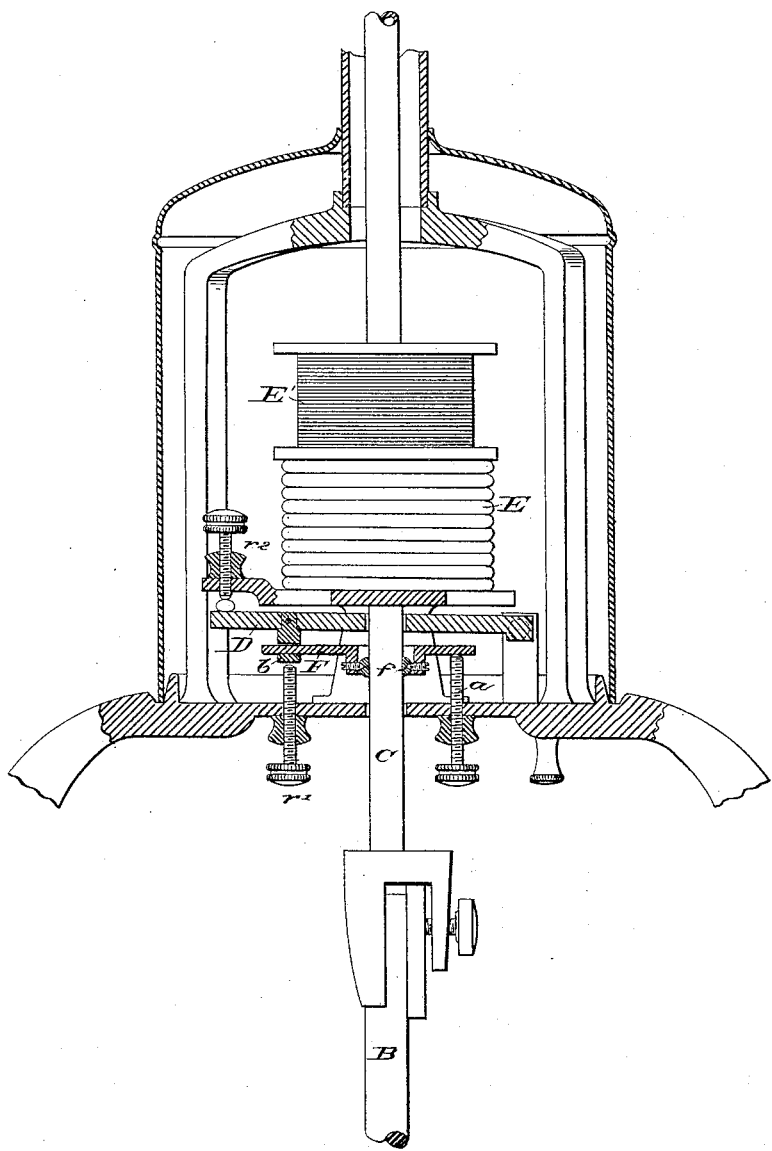

UNITED STATES PATENT OFFICE.

ELISHA B. CUTTEN, OF PITTSBURG, PA., ASSIGNOR TO THE ELECTRICAL AND MECHANICAL DEVELOPING COMPANY, OF SAME PLACE.

ELECTRIC-ARC LAMP.

SPECIFICATION forming part of Letters Patent No. 324,305, dated August 11, 1885.

Application filed July 7, 1884. (No model.)

*To all whom it may concern:*

Be it known that I, ELISHA B. CUTTEN, a British subject, residing at Pittsburg, Pennsylvania, have invented certain new and useful Improvements in Electric-Arc Lamps, of which the following is a specification.

My invention relates, principally, to duplex electric lamps, or those employing two pairs of carbons, but a portion of it is equally applicable to single lamps.

The principal feature of my invention is an improvement upon the tilting clutch washer or ring employed for grasping and sustaining the rod carrying the upper-carbon pencil. I employ in its place a clutch-lever in which a ring is pivoted.

My invention also relates to other features of the lamp, as will be hereinafter fully set forth.

Figure 1:
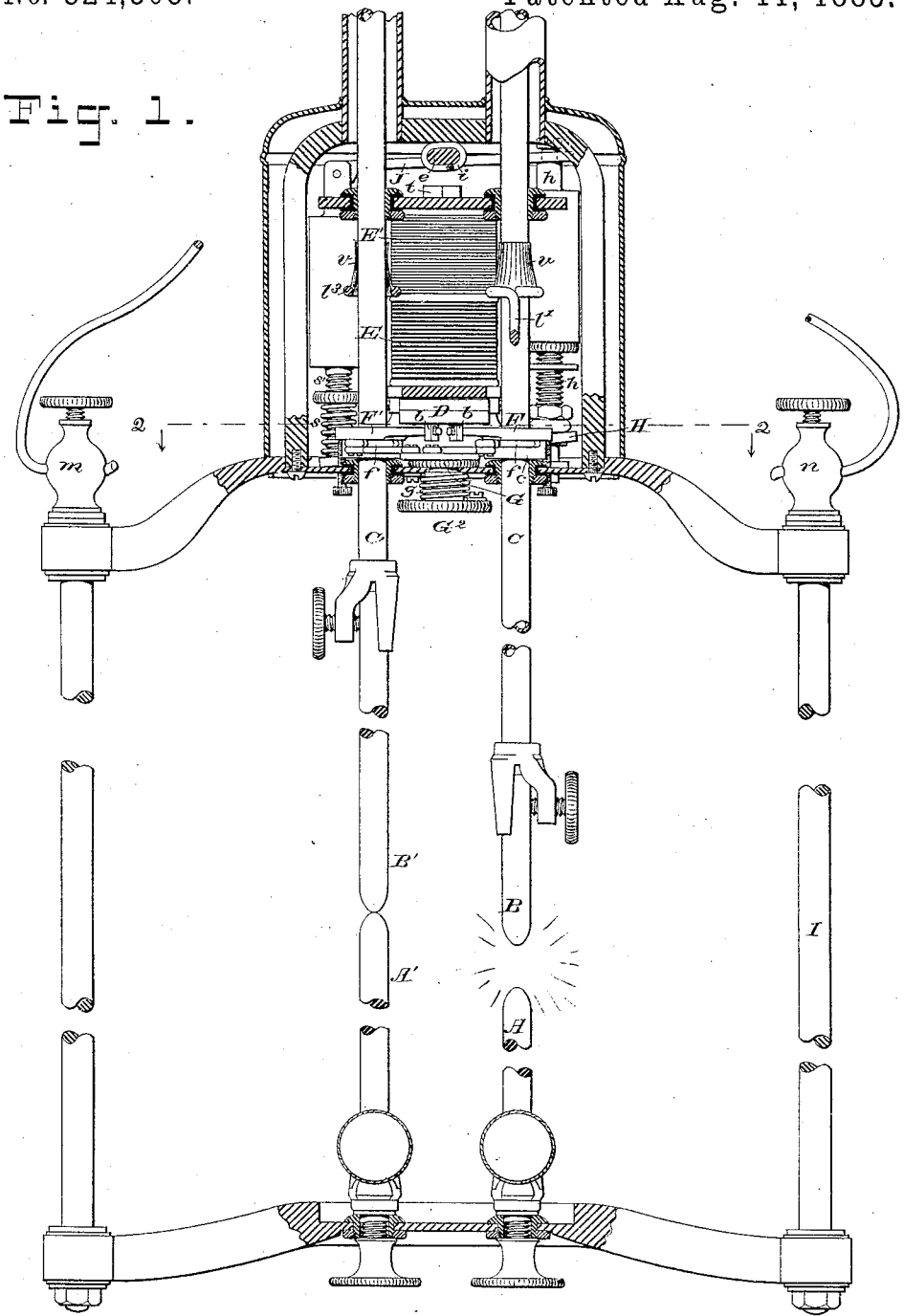
Figure 2:
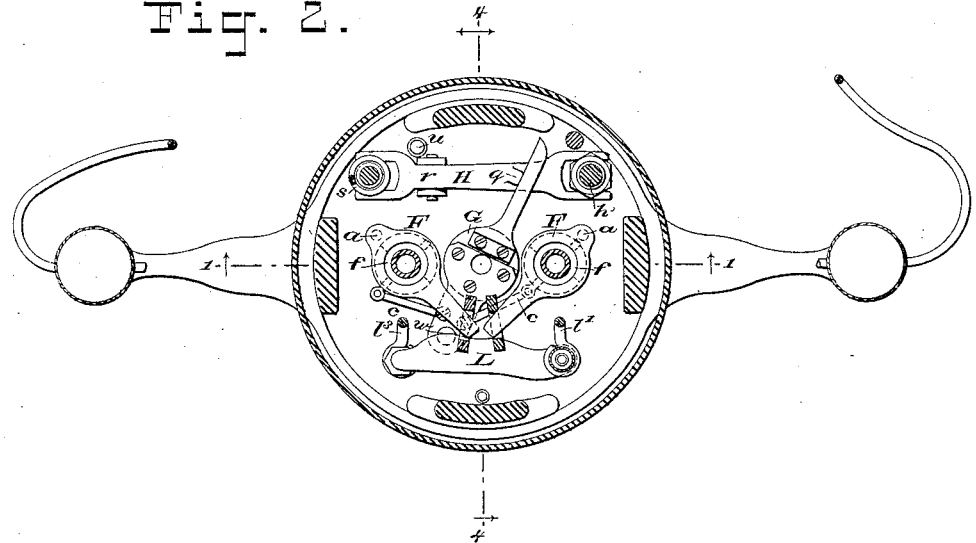
Figure 3:
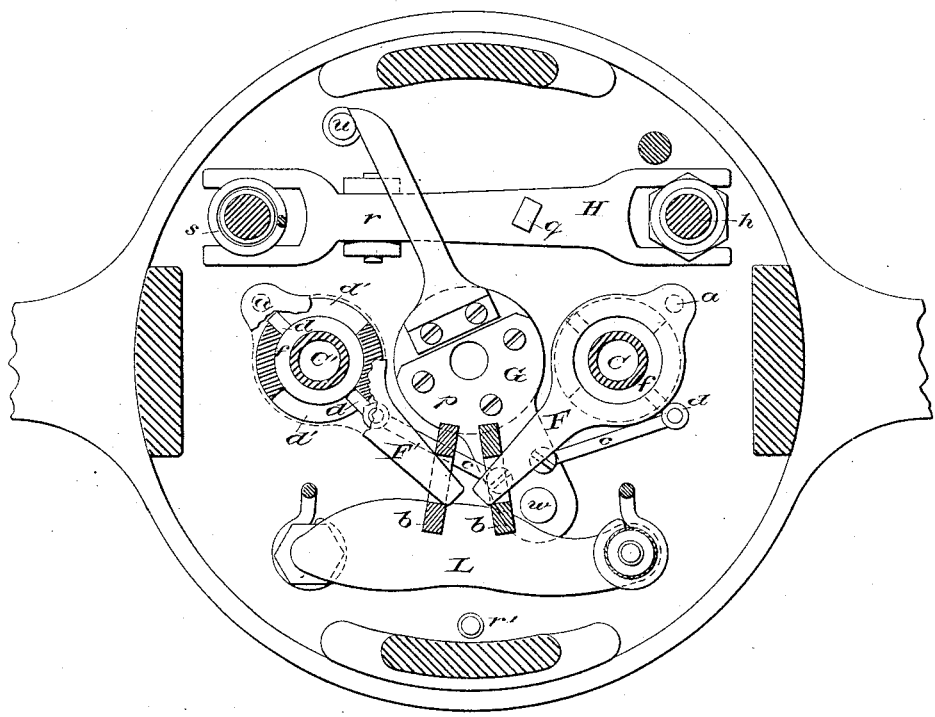
Figure 4:
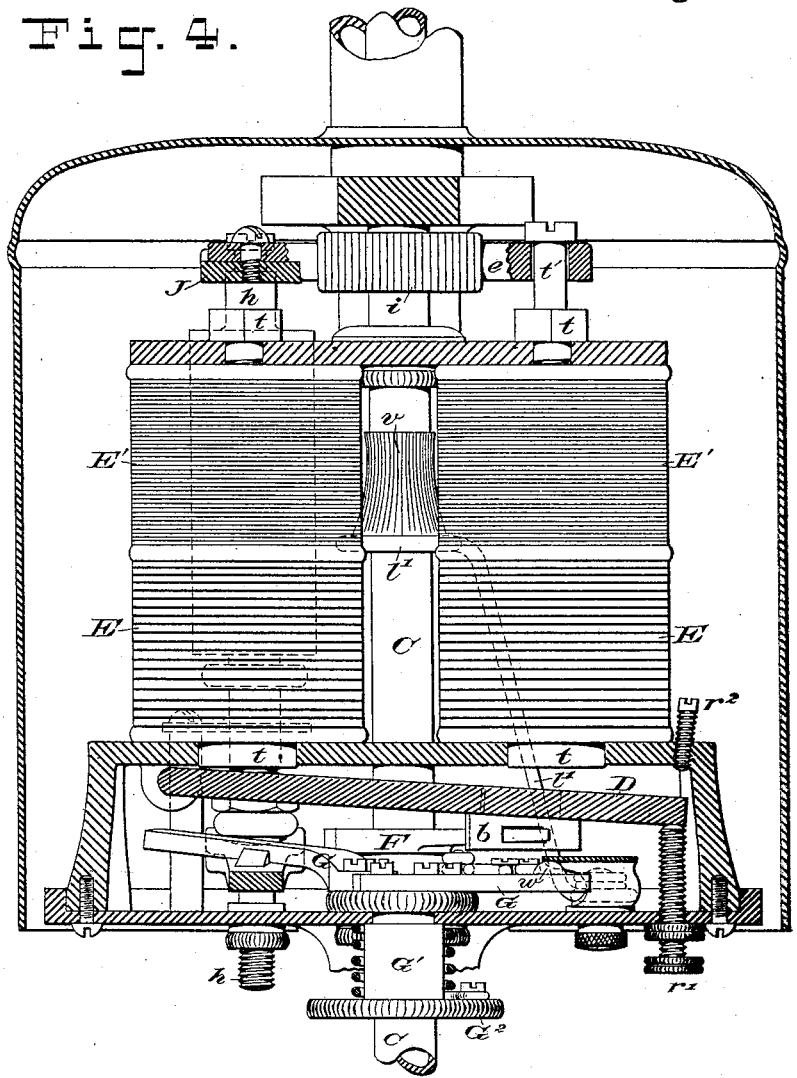
Figure 5:
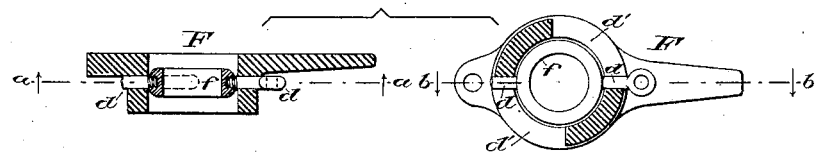

Figure 1 of the accompanying drawings is a front elevation, partly in vertical mid-section, of a duplex electric lamp constructed according to my invention. Fig. 2 is a horizontal section thereof cut in the plane of the line 2 2 in Fig. 1. Fig. 3 is an enlargement of Fig 2, showing the parts in a different position. Fig. 4 is a vertical section on the same scale as Fig. 3, cut in the plane of the line 4 4 in Fig. 2. Fig. 5 shows the clutch-lever in two sectional views. Fig. 6 is a diagram showing the relations of the electrical and mechanical parts. Figs. 7 to 11 are illustrative sketches and diagrams; and Fig. 12 is a vertical section of a modified form of lamp having but a single pair of carbon pencils.

In its general construction my improved electric lamp is the same as that of the lamps now most commonly in use, and requires no description. The lower carbons, A A', are clamped to the lower cross-head of the frame, and the upper carbons, B B', are carried by the sliding rods C C', as usual. These rods are engaged by clutches operated by the armature D of an electro-magnet, E, wound with coarse and fine wire coils. The carbons A B and rod C are the first to operate, and when these carbons are consumed and a long arc is formed a shifting device is automatically brought into action, which shunts the current to the second pair of carbons, A' B', and at the same time renders the clutch engaging the rod C' operative. The clutches which engage the rods C C' take the place of the tilting ring or washer heretofore used, and operate on the same principle. A lever, F, (shown in Fig. 7,) is formed with a ring-shaped enlargement, and inside of this is pivoted a circular ring, $f$, the axis of its pivots $d\ d$ extending lengthwise of the lever. The ring $f$ fits the rod C or C' loosely. If this rod be put through the ring, the short arm of lever F be rested on the end of the adjusting-screw $a$, and the long arm of the lever be connected to the armature D of the magnet E, all as shown in Fig. 8, then, if the screw $a$ be properly adjusted, the corners of the ring $f$ will bite the rod C and hold it sustained whenever the armature is attracted, and when the armature is released the ring will be disengaged from the rod, and the latter will slide downward until again arrested by the tilting of the lever and ring by the armature. The tilting of the ring $f$ is essential to this result.

It is obvious that if the ring were pivoted on a transverse axis, as shown in Fig. 9, the tilting of the lever F would not tilt the ring, and the latter could not bite or clamp the rod.

If the arrangement shown in Fig. 8 were made duplex, as shown in Fig. 10, and one of the levers had its ring pivoted as shown in Fig. 7, while the other had its ring pivoted as in Fig. 9, it is obvious that only one rod, C or C', would be acted upon by the movements of the armature, and if after a time the rings $f f$ in both levers could be suddenly shifted or rotated until their pivotal axes stood at right angles to their first position, the clutch which was first operative would be rendered impotent, and that which was first impotent would be rendered operative. This I accomplish in the manner indicated in Fig. 11, which is a plan of the two clutch-levers, their rings being shown by heavy black lines. The levers are arranged obliquely, resting on adjusting-screws at $a$, and being connected to the armature at $b$. The rings $f$ have each one of their pivots prolonged and jointed to a cross-rod, $c$, and they are so mounted that by moving this cross-rod they can be shifted from the position shown in full lines to that shown in dotted lines.

As shown in full lines, the right-hand clutch-lever is operative, and as shown in dotted lines the left-hand lever is operative. Fig. 6 shows how this shifting may be accomplished. Between the two clutch-levers F F' is a shifting-lever, G, drawn to the left by a spring, $g$, and held at the right by a catch-lever, H. Two cross-rods, $c\ c$, are employed, connecting the two rings $f\ f$ to the lever $g$. The magnet E has an upper armature, $e$, which, when it is drawn down, acts through a rod, $h$, to tilt the catch-lever H and release the lever G, which flies to the left and shifts the two clutch-rings. At starting the right-hand clutch-lever F is in operative engagement with the rod C, and the current flows from the binding-post $m$ through wire $l$ around coil $i$ on armature $e$, thence through coils E E and through wire $l'$ to rod C, thence through carbons B A and frame I to the other binding-post, $n$. The coils $i$ and E E are wound oppositely, thus tending to repel the armature $e$. A derived circuit of high resistance, $j\ j$, traverses coils E' E', which are wound oppositely to the coils E E. Ordinarily but little current passes through coils E' E', because of their high resistance. When the pencils B A burn out, the long arc between them greatly increases the resistance in the main circuit and considerable current is diverted into the derived circuit, so that the coils E' E' reverse the polarity of their cores sufficiently to attract the armature $e$, which, pressing down the rod $h$, trips the lever H and releases the lever G, which flies over to the left against a contact-stop, $k$, and at the same time shifts the two clutch-rings. The circuit is now shunted to the second pair of carbons through wire $l^2$, lever G, stop $k$, and wire $l^3$ to rod C', and the arc is immediately established between pencils B' and A', as shown. The clutch-lever F' being now operative, the regulating-magnet serves to feed down the pencil B' as long as the lamp continues to burn. When the second pair of pencils is consumed, the lamp will go out, and when several lamps are to be maintained in one circuit it is necessary that each lamp be provided with an automatic shunt to cut it out of circuit when it goes out, in order not to extinguish also the other lamps. I provide such a shunt, but as it forms no part of my present invention I have not shown it in the drawings.

I will now describe my improved duplex lamp more in detail, referring to Figs. 1 to 5. The construction of the clutch-lever and ring is shown in Fig. 5. The annular portion of the lever F is in the form of a downwardly-projecting flange, and the bearings for the pivots $d\ d$ of the ring $f$ are formed in this flange. These bearings are simply two slots, $d'\ d'$, extending each a quarter around the annular flange, as shown in the right-hand view, which is a section cut through these slots. Thus the ring may be turned in the manner described, its pivots sliding around in these slots. The ring $f$ is sufficiently guided by the rod C or C', which passes through it.

Referring to Figs. 2 and 3, the levers F F' are arranged obliquely, their short arms resting on the ends of adjusting-screws $a\ a$, and their long arms engaged by blocks $b\ b$, preferably of insulating material, which are fixed to the under side of the armature D, as shown in Figs. 1 and 4. The lever G is fulcrumed in the center of the lamp, being mounted on the upper end of a short shaft, G', which passes down through a base-plate and bears on its lower end a milled head, G². The spring $g$ is coiled around this shaft, one end being fixed to the base-plate and the other to the head G². The two cross-rods or connecting-links $c\ c$ are very loosely jointed to the prolonged pivots of the rings $f\ f$, and are also loosely jointed to the lever G. The portion of this lever to which they are connected is a plate, $p$, of insulating material, thus insulating the two rods $c\ c$ from each other and from the metallic portion of the lever G. The catch-lever H lies beneath the lever G, and has a beveled tooth, $q$, to catch the tail of the latter when turned as in Fig. 2. The lever H is fulcrumed at $r$, and its short arm is pressed down by a helical spring, $s$, coiled around a screw-threaded rod, on which screws a nut, $s'$, to adjust the tension of the spring, Fig. 1. The long arm of lever H is in connection with a rod, $h$, Fig. 1, which is arranged to be pressed down when the armature $e$ is attracted. This armature extends across over the cores $t\ t$ of the magnet E, as shown in Fig. 4, being wound with a coil, $i$, as described, consisting of a few turns of coarse wire. One end of the armature $e$ is guided by a screw, $t'$, which passes freely through a hole in it, and the other end is fastened to a cross-lever, J. This lever (shown best in Fig. 1) is fulcrumed at one end, and its other end rests on the top of the rod $h$. When the armature $e$ is attracted it moves downward, carrying with it the lever J and pressing down the rod $h$, which presses down the long arm of the lever H until its tooth $q$ passes beneath and frees the lever G, when the latter flies over to the position shown in Fig. 3, being arrested by the stop $u$. The current passes to the rod C or C', as the case may be, through brushes $v\ v$, encircling the rods, and mounted on arms $l'$ and $l^3$, which answer to the wires $l'\ l^2$ in Fig. 6. One terminal of the coils E E is carried to the base of the arm $l'$, and a spring-arm, L, is also fastened there, all three being in electrical contact. This spring L extends across to the base of arm $l^3$, and tends to press downward thereon. While the first pair of carbons is burning a button, $w$, on the lever G stands under the spring and holds it up out of contact with the base of arm $l^3$; but when the lever G flies over this button moves beyond the spring, Fig. 3, and the latter drops and shunts the circuit to the arm $l^3$ and the second pair of carbons. The spring $l$ is so bent that when the lever G is being replaced or "set" the button $w$ passes under it and lifts it again.

When the attendant is fitting the lamp with new carbons, he "sets" the lever G by turning the milled head G² until the lever is caught and held by the lever H. The lamp is then automatic until both pairs of carbons are consumed.

The play of the armature D is adjusted by opposite screws, r' and r², Fig. 4, the length of the arc being determined by an adjustment of these screws relatively to the screws a a.

Fig. 12 shows my improved clutch-lever as applied to a single lamp. The rod C passes up through the center of the tubular core of the magnet. The ring f is pivoted on pointed screws passing through the annular flange on the lever F, its pivotal axis extending longitudinally of the lever.

The other features of construction and the operation will be readily understood.

I claim as my invention—

1. A feeding-clutch for electric-arc lamps, consisting of a ring pivoted within a tilting lever, substantially as set forth.

2. In an arc lamp, the combination, with the carbon-holding rod, of a feeding-clutch consisting of a ring loosely fitting said rod, and a lever surrounding said ring and to which it is pivoted on a pivotal axis extending longitudinally of said lever, and the armature of the regulating-magnet, in connection with and adapted to tilt said lever, substantially as set forth.

3. In an arc lamp, the combination of the carbon-holding rod, a clutch consisting of a ring pivoted within a tilting lever on a pivotal axis extending longitudinally thereof, the armature of the regulating-magnet connected to one arm of said lever and adapted to lift or depress it, suitable adjustable stops for limiting the motion of the armature, and an adjustable support for the opposite arm of said tilting lever, substantially as set forth.

4. A feeding-clutch for an arc lamp, consisting of a ring having diametrically-opposite pivots, and a clutch-lever within which said ring is pivoted, and having bearings for said pivots extending from a longitudinal to a transverse position, whereby the ring may be turned within said lever and be thereby rendered operative or impotent at pleasure, substantially as set forth.

5. In a duplex electric lamp, the combination, with the regulating-magnet and the two carbon-holding rods, of two feeding-clutches, one for each rod, and each consisting of a clutch-lever with a ring pivoted within it and capable of being turned with its pivotal axis longitudinally or transversely of the lever, and with means, substantially as described, for turning said rings, so arranged that when the pivotal axis of one extends longitudinally that of the other extends transversely of its lever, thereby rendering one clutch operative and the other impotent, substantially as set forth.

6. In a duplex electric lamp, the combination, with the regulating-magnet and the two carbon-holding rods, of two feeding-clutches, one for each rod, and each consisting of a clutch-lever with a ring pivoted within it and capable of being turned with its pivotal axis longitudinally or transversely of the lever, thereby rendering the clutch operative or impotent, the clutch for feeding the first pair of carbons being primarily operative and that for the second pair primarily impotent, with a shifting mechanism, substantially as specified, adapted to act automatically upon the burning out of the first pair of carbons to shift the clutches, and thereby render that for the second pair operative and the first impotent, substantially as set forth.

7. In a duplex electric lamp, the combination, with the regulating-magnet and the two carbon-holding rods, of two feeding-clutches, one for each rod, and each consisting of a clutch-lever with a ring pivoted within it and capable of being turned with its pivotal axis longitudinally or transversely of the lever, thereby rendering the clutch operative or impotent, the clutch for feeding the first pair of carbons being primarily operative and that for the second pair primarily impotent, with a spring-actuated shifting-lever adapted, when released, to shift said clutches and render the first impotent and the second operative, a spring-catch adapted to retain said lever when set, and electro-magnetic means, substantially as described, for withdrawing said catch, all adapted to operate substantially as set forth.

8. In a duplex electric lamp, the combination, with the regulating-magnet and the two carbon-holding rods, of two feeding-clutches, one for each rod, and each consisting of a clutch-lever with a ring pivoted within it and capable of being turned with its pivotal axis longitudinally or transversely of the lever, thereby rendering the clutch operative or impotent, the clutch for feeding the first pair of carbons being primarily operative and that for the second pair primarily impotent, with a spring-actuated shifting-lever adapted, when released, to shift said clutches and render the first impotent and the second operative, and a shunt operated by said lever and adapted to admit the current to the second pair of carbons, substantially as set forth.

In witness whereof I have hereunto signed my name in the presence of two subscribing witnesses.

ELISHA B. CUTTEN.

Witnesses:
   CALEB C. LEE,
   EMMETT E. COTTON.